April 30, 1968 — A. R. BRAULT — 3,380,322
ANGULAR WORK INDEXING TABLE
Filed Feb. 4, 1966

INVENTOR.
ANDRE R. BRAULT

United States Patent Office 3,380,322
Patented Apr. 30, 1968

3,380,322
ANGULAR WORK INDEXING TABLE
Andre R. Brault, North Merrick, N.Y., assignor to
OPTOmechanisms, Inc., Plainview, N.Y.
Filed Feb. 4, 1966, Ser. No. 525,045
2 Claims. (Cl. 77—64)

ABSTRACT OF THE DISCLOSURE

An angular indexing table rotatably mounted on a base and having gear teeth on its periphery. A calibrated dial on the table and an index mark on the base, and at least two indexing means mounted on the base and adapted to engage the gear teeth to index the table.

---

This invention relates to work holding tables which are adapted to be rotatably indexed.

There is a need for a work holding table which is adapted to be rotatably stepped or indexed with a predetermined angular accuracy. Such work holding tables are used in machine operations for instance, with a drill press.

Working holding tables of the prior art are primarily used with micrometer settings. This is a very tedious process which is subject to human error and is not suitable for production machinery.

The present invention comprises a rotatably mounting table which can be rapidly set to a predetermined angle in convenient increments for instance, one-half degree. The invention generally comprises a base member and a rotatable work holding member which is a large gear, or a suitably segmented circular part with a suitable number of teeth. The work holding gear table has a calibrated dial and has gear teeth around its outer edge.

A pair of slidable members are provided on the base. The slidable members have teeth which are adapted to engage the gear teeth. One slidable member is spaced from the index mark a whole number of degrees and the second slidable member is spaced from the index mark by a multiple of one-half degree increments.

Therefore, the table may be quickly set by lining up the dial approximately with the index mark and the table may be indexed quickly and to the proper degree mark or to the one-half degree mark by pushing in one of the indexing slidable members.

Accordingly, a principal object of the invention is to provide new and improved angular indexing work holding means with precision accuracy.

Another object of the invention is to provide new and improved angular indexing work holding means which may be rapidly and accurately set in predetermined increments.

Another object of the invention is a provide new and improved angular indexing work holding means which may be rapidly and accurately set in predetermined increments without the use of micrometer settings or other equivalent measuring means.

Another object of the invention is to provide new and improved angular indexing work holding table means which are adapted for production machinery and which have semi-automatic indexing means which are not subject to human error.

Another object of the invention is to provide new and improved angular indexing work holding table means which are adapted for production machinery and which have slidable indexing means which are not subject to human error.

These and other objects of the invention will be apparent from the following specification and drawings of which:

Figure 1:
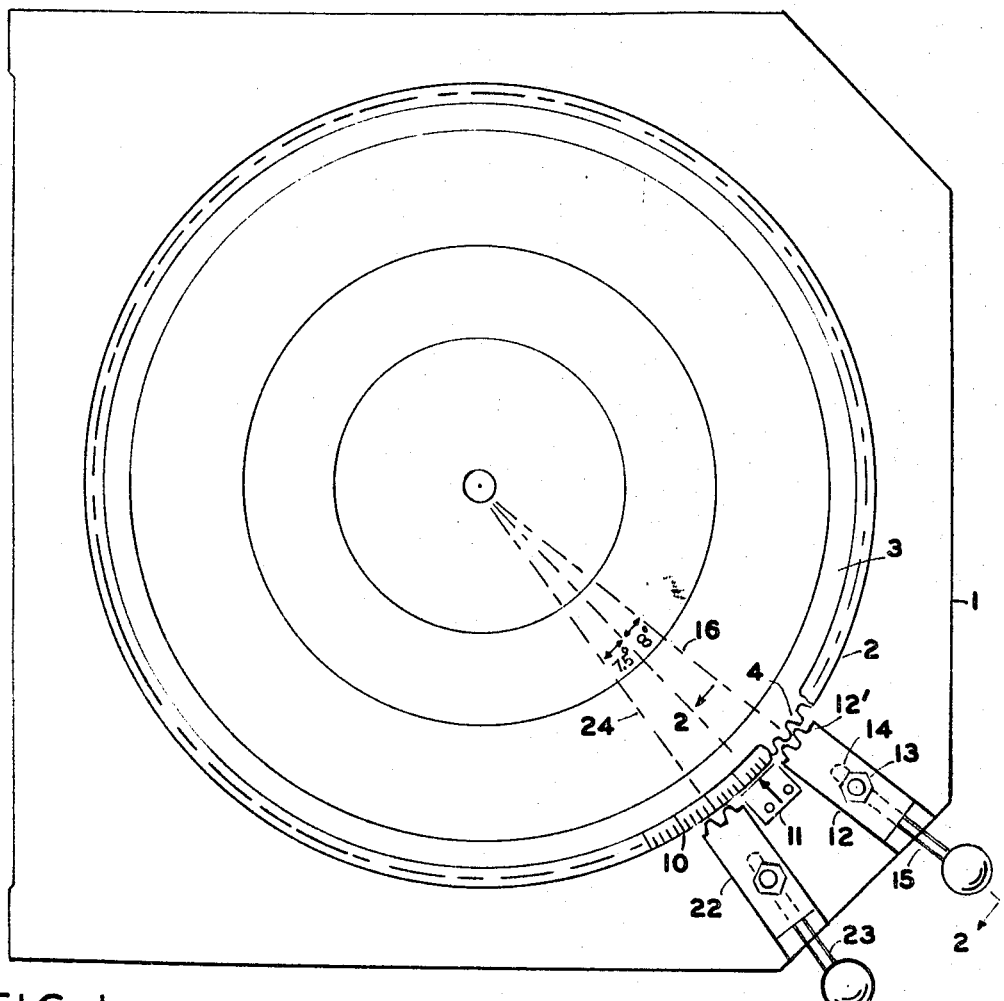
FIGURE 1 is a top view of an embodiment of the invention.
Figure 2:
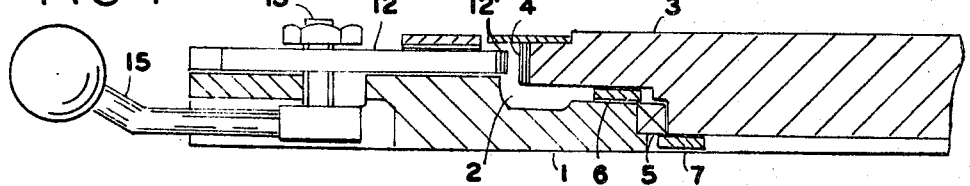
FIGURE 2 is an enlarged sectional view of the embodiment of FIGURE 1 taken along the lines 2—2 of FIGURE 1.

Referring to the figures, the invention generally comprises a base member 1 which has a large round center aperture 2. The sides of the aperture are recessed and adapted to rotatably support a work holding table 3 which has gear teeth 4 spaced around its periphery. In effect, the member 3 is a large gear having a recessed side portion which is adapted to fit in the recessed base member 1. The gear table is mounted on top of bearing 5 which is mounted in a recessed portion of the base 1 by means of retaining rings 6 and 7. The table 3 has a dial 10 extending around its periphery which is divided up into degree marks and sub-multiples thereof. The dial is used to approximately set the table manually against the index mark 11 which is fixedly mounted on the base member 1.

In order to index the table accurately and positively to a predetermined angle, a slidable member 12 is provided which is slidably mounted on a radius in the base 1 by means of bolt 13, which extends through a slot 14, in the base. The lower outer edge of the base 1, is recessed to accommodate the handle 15 connected to the bolt 13. The axis 16 of the slidable member is on a radius of the table 3 which is spaced a predetermined number of full degrees from the index mark 11, for instance 8 degrees.

Therefore, after the table has been approximately set to the desired angle manually, the slidable member 12 is pushed in by the handle 15 and teeth 12' engage the teeth 4 of the table 3 and index the table to a position so that the full degree mark on the table is lined up with the index mark 11.

In order to line up the table with one-half degree marks, another slide 22 is provided which is mounted on a radius 24 which is spaced a multiple of one-half degree from the index mark 11. The slide member has a handle 23 and otherwise is identical to the slidable member 12. Therefore, by first approximately setting the table and then pushing in the slidable member 22, the table will be indexed to the desired one-half degree mark.

It will be appreciated that other slide members could be added to index the table to ¼ degree marks, etc.

It will be appreciated that the accuracy of the setting is determined by the gear teeth accuracy and this can be done as accurately as desired. The gear teeth are preferably rounded to facilitate the engagement of the slide and the table gear teeth.

If the table is a large one, it may be desirable to motorize it, which may be conveniently done by adding a motor driven gear to engage the gear teeth on the table.

Therefore, the present invention provides an angular indexing working table having simple indexing means which will minimize human error and will provide accurate indexing of the table to predetermined increments.

Many modifications may be made by those who desire to practice the invention without departing from the scope thereof which is defined by the following claims.

I claim:
1. Angular indexing table means comprising,
a base having a round center aperture,
an angular indexing work table rotatably mounted on said base member within said aperture,
said table having accurately spaced gear teeth extending around its periphery,
an indexing member mounted on a first radius of said base,
said indexing member having teeth adapted to engage said gear teeth, a dial on said table calibrated in angular increments, and an indexing mark on a second radius spaced a predetermined angle from said first radius whereby said table may be rotated to an approximate angular position and indexed accurately by pushing in said slide member, a second indexing member mounted on said base and having teeth to engage said gear teeth, said second member being mounted on a third radius of said base angularly spaced for said second radius by a multiple of one-half degree.

2. Apparatus as in claim 1 having multiple indexing members spaced predetermined sub-multiples of degrees from said index mark.

References Cited
UNITED STATES PATENTS

| | | | |
|---|---|---|---|
| 450,399 | 4/1891 | Corlis | 77—64 |
| 2,144,486 | 1/1939 | Erb | 269—67 |
| 2,395,893 | 3/1946 | Marlow | 77—64 |

FRANCIS S. HUSAR, *Primary Examiner.*